B. O. GRAHAM.
FLY SWATTER.
APPLICATION FILED OCT. 18, 1919.
1,344,943.
Patented June 29, 1920.
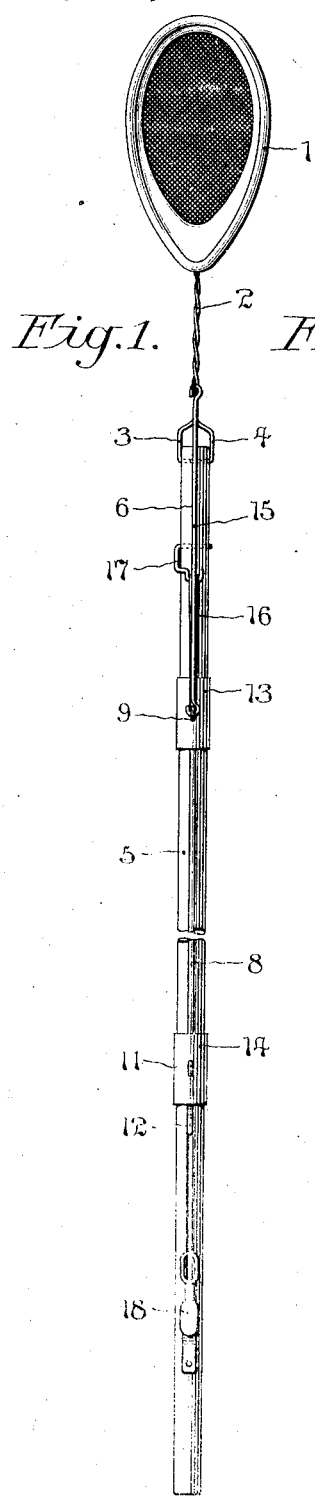
Fig. 1.
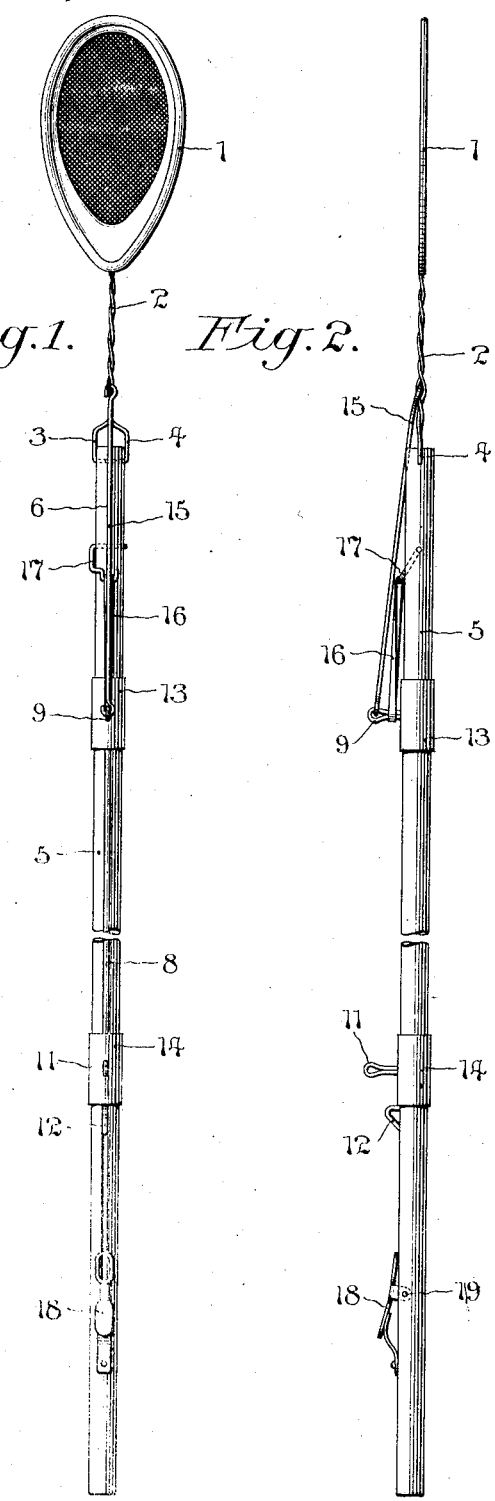
Fig. 2. Fig. 3.
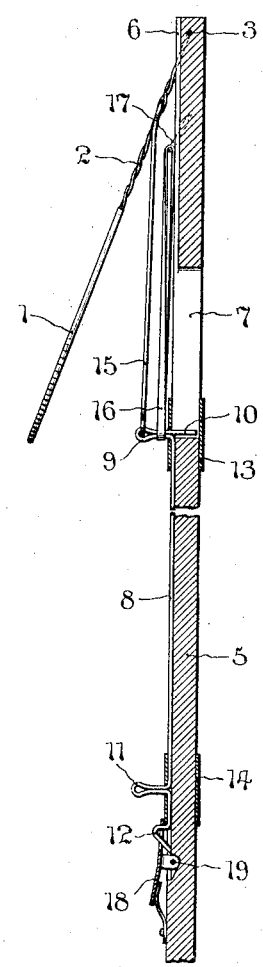
Inventor:
B. O. Graham
by attorneys

UNITED STATES PATENT OFFICE.

BERT O. GRAHAM, OF CORDOVA, TERRITORY OF ALASKA.

FLY-SWATTER.

1,344,943.  Specification of Letters Patent.  Patented June 29, 1920.

Application filed October 18, 1919. Serial No. 331,704.

*To all whom it may concern:*

Be it known that I, BERT O. GRAHAM, a citizen of the United States, and resident of Cordova, Territory of Alaska, have invented a new and useful Improvement in Fly-Swatters, of which the following is a specification.

The object of my invention is to provide an appliance to which a fly swatter of any well known or approved form may be attached, for enabling a person to bring a fly swatter into position for use against the ceiling or walls of a room beyond the ordinary reach of the person, the person at the same time being enabled to keep a sufficient distance away from the fly not to frighten it away.

A further object is to provide novel means carried by the appliance and connected to the swatter for operating the swatter, whereby a blow of predetermined force may be delivered, sufficient to kill or stun the fly without crushing it.

My invention further comprises certain improvements in the construction and arrangement of the several parts, whereby the appliance may be made very cheaply and yet will be effective for the purpose intended.

A practical embodiment of my invention is represented in the accompanying drawings, in which—

Figure 1 represents a front view of my appliance with a fly swatter of well known form applied thereto.

Fig. 2 represents a side view of the same, and

Fig. 3 represents a detail longitudinal section through the appliance, the swatter being shown swung back and held in its set position ready to be released.

The fly swatter which is illustrated herein comprises the loop 1 and the twisted wire handle 2, the free ends 3 and 4 of which are pivoted in the upper end of the extension handle 5 of the appliance.

This extension handle may be of any desired length and it has a surface groove 6 extending a considerable distance along the same. An elongated slot 7 extends through the handle and communicates with the surface groove 6.

An operating rod 8 extends along and is slidable in the surface groove 6, which rod is bent at its upper end to form an outwardly projecting arm 9 and an inwardly projecting arm 10. This inwardly projecting arm 10 is located and slides within the elongated slot 7 to prevent the rod from turning. The operating rod 8 is bent at its lower end to form a handle 11 and a hook 12.

A ferrule 13 embraces the upper end of the operating rod 8 and slides upon the extension handle 5, through which ferrule the outwardly extending arm 9 projects. A ferrule 14 embraces the lower end of the operating rod 8 and slides upon the extension handle 5, through which ferrule the handle 11 projects.

A link 15 is connected at its ends to the arm 9 of the operating rod 8 and to the handle 2 of the fly swatter.

A suitable spring 16, in the present instance, a rubber band is shown for normally holding the fly swatter in line with the extension handle, one end of the spring being connected to the arm 9 of the rod 8, and the other end of the spring being connected to a loop 17 hinged to the handle 5.

A spring pressed releasing catch 18 is hinged at 19 to the extension handle 5 in position to engage the hook 12 of the operating rod when the rod has been drawn downwardly to set the fly swatter. To release the swatter the catch 18 is manipulated by the person to release it from the hook 12, thereby enabling the spring 16 to swing the swatter from its set position to a position against the ceiling or wall. The swinging movement of the swatter under spring tension is limited by the engagement of the link 15 with the upper end of the extension handle 5.

From the above description, it will be seen that I have produced an appliance to which a fly swatter of any well known or approved design may be attached, which appliance is very simple in construction and in which the fly swatter may be set before it is brought into proximity to the fly, and then released by a slight movement of the catch. This insures great reliability in the operation of the swatter.

It is evident that various changes may be made in the construction, form, and arrangement of the several parts of the appliance without departing from the spirit and scope of my invention; hence I do not wish to limit myself to the particular embodiment herein shown and described, but

What I claim is:

1. The combination with a fly swatter, of an extension handle to the outer end of which the handle of the swatter is pivoted, an operating rod connected to said swatter and slidable along the extension handle, an actuating spring connecting the extension handle and rod, and a hand operated releasing device for holding the rod in position to set the swatter.

2. The combination with a fly swatter, of an extension handle to the outer end of which the handle of the swatter is pivoted, said extension handle having a surface groove extending along the same, an operating rod connected to the swatter and slidable in said groove, an actuating spring connecting the extension handle and rod, devices slidable on the extension handle for holding the rod in its groove, and a hand operated releasing device for holding the rod in position to set the swatter against its spring.

3. The combination with a fly swatter, of an extension handle to the outer end of which the handle of the swatter is pivoted, said extension handle having a surface groove extending along the same and an elongated slot communicating with said groove, an operating rod connected to the swatter, slidable in said groove, and having an arm slidable in said slot to prevent the rod from turning, an actuating spring connecting the extension handle and rod, devices slidable on said extension handle to hold the rod in the groove, and a hand operated releasing device for holding the rod in position to set the swatter against its spring.

4. The combination with a fly swatter, of an extension handle to the outer end of which the handle of the swatter is pivoted, an operating rod connected to said swatter and slidable along the extension handle, an actuating spring connecting the extension handle and rod, said rod having a hook, and a hand operated releasing catch for engaging said hook to hold the rod in position to set the swatter.

5. The combination with a fly swatter, of an extension handle to which the outer end of the handle of the swatter is pivoted, said extension handle having a surface groove extending along the same, and an elongated slot communicating with said groove, an operating rod slidable in said groove and slot, said rod being bent to form a handle and a hook, a link connecting said rod with the swatter, an actuating spring connecting said rod and last named handle, and a hand operated releasing catch for engaging said hook to hold the rod in position to set the swatter.

6. The combination with a fly swatter, of an extension handle to the outer end of which the handle of the swatter is pivoted, said extension handle having a surface groove extending along the same, and an elongated slot communicating with said groove, an operating rod slidable in said groove and slot, said rod being bent to form a handle and a hook, a link connecting said rod with the swatter, an actuating spring connecting said rod and last named handle, and a hand operated releasing catch for engaging said hook to hold the rod in position to set the swatter, and ferrules slidable on the extension handle for retaining the operating rod in its groove.

In testimony that I claim the foregoing as my invention I have signed my name this seventh day of October, A. D. 1919.

B. O. GRAHAM.